United States Patent [19]
Reiser

[11] 3,867,842
[45] Feb. 25, 1975

[54] UNBALANCE DETECTOR

[76] Inventor: Alfred A. Reiser, 6976 Old Lake Shore Rd., Lake View, N.Y. 14085

[22] Filed: Dec. 5, 1973

[21] Appl. No.: 421,784

[52] U.S. Cl. .................................................. 73/480
[51] Int. Cl. ............................................ G01m 1/12
[58] Field of Search ...................... 73/480, 66, 460

[56] References Cited
UNITED STATES PATENTS

| | | | |
|---|---|---|---|
| 407,589 | 7/1889 | Griffin | 73/480 |
| 3,201,997 | 8/1965 | Rosenblum | 73/480 |
| 3,820,403 | 6/1974 | Thompson | 73/480 |

Primary Examiner—James J. Gill
Attorney, Agent, or Firm—Joseph P. Gastel

[57] ABSTRACT

A machine for detecting the unbalance of a workpiece which is to be rotated including a base mounting a horizontal shaft on bearings, means for mounting the workpiece on the shaft, a first impeller fixed to the shaft, a motor for rotating a second impeller spaced from the first impeller so as to thereby apply a rotary force to the first impeller to maintain the point of effective maximum unbalance of the workpiece at a position which is ninety degrees from bottom dead center, a speed control for varying the speed of the motor, and calibration correlated with the speed control for indicating the value of a counterweight required to maintain said point of effective maximum unbalance of said workpiece in said position.

12 Claims, 8 Drawing Figures

UNBALANCE DETECTOR

The present invention relates to an unbalance detector of the type used in determining the static unbalance of a body which is to be rotated.

By way of background, there are many devices in use for detecting the position and amount of unbalance that exists in a body that is ultimately to be mounted for rotation at speeds which would cause the unbalance to generate undesirable forces which could result in objectionable vibrations in the apparatus mounting the rotating body. As is well known, when such vibrations exceed a given magnitude, they not only prove destructive to the rotating body but to the apparatus on which it is mounted.

In the past there have been numerous devices conceived for the purpose of detecting static unbalance of a body. Certain of these devices mounted the body on a horizontal shaft which was permitted to rotate until the point of effective maximum unbalance gravitated to bottom dead center and thereafter weights were placed at 180° from this point on the body by trial and error until the body was balanced. In other devices the point of maximum unbalance was rotated to 90° from bottom dead center and then a scale or weighing arrangement was used to measure the amount of unbalance and thereafter a counterweight was placed 180° from the point of effective maximum unbalance. The foregoing devices were deficient in that either the amount and position of unbalance could not be detected rapidly and accurately or the cost of the machine was so high that it was economically beyond the reach of a large number of concerns which could benefit from the use of a device of this type. It is with overcoming the foregoing deficiencies of prior static balancing devices that the present invention is concerned.

It is accordingly one important object of the present invention to provide an improved machine for detecting the static unbalance in a body, the machine being capable of detecting the unbalance rapidly and accurately. A related object of the present invention is to provide an improved relatively simple and low cost machine for detecting static unbalance of a body, the machine being capable of operating in a manner which is competitive with machines which are more complex and costly. Other objects and attendant advantages of the present invention will readily be perceived hereafter.

The present invention relates to an unbalance detector comprising base means, a horizontal shaft having first and second spaced portions, bearing means mounting said horizontal shaft on said base means, means on said first portion for mounting a workpiece to be balanced, whereby said workpiece may gravitate to a position wherein its point of effective maximum unbalance is located at bottom dead center, motor means, speed control means for said motor means, slip-coupling means effectively located between said motor means and said second portion of said shaft, whereby said point of effective maximum unbalance may be maintained in a predetermined position other than bottom dead center by adjusting the speed of said motor means, and means correlated with said speed control means for indicating the value of the counterweight required to maintain said point of effective maximum unbalance in said predetermined position.

The various aspects of the present invention will be more fully understood when the following portions of the specification are read in conjunction with the accompanying drawings wherein.

Figure 4:
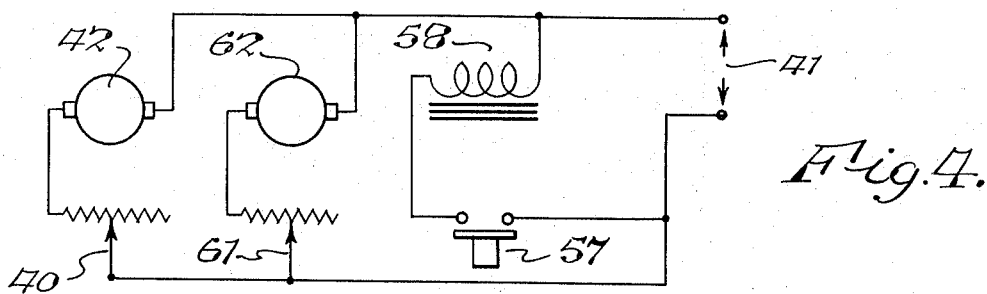
Figure 3:
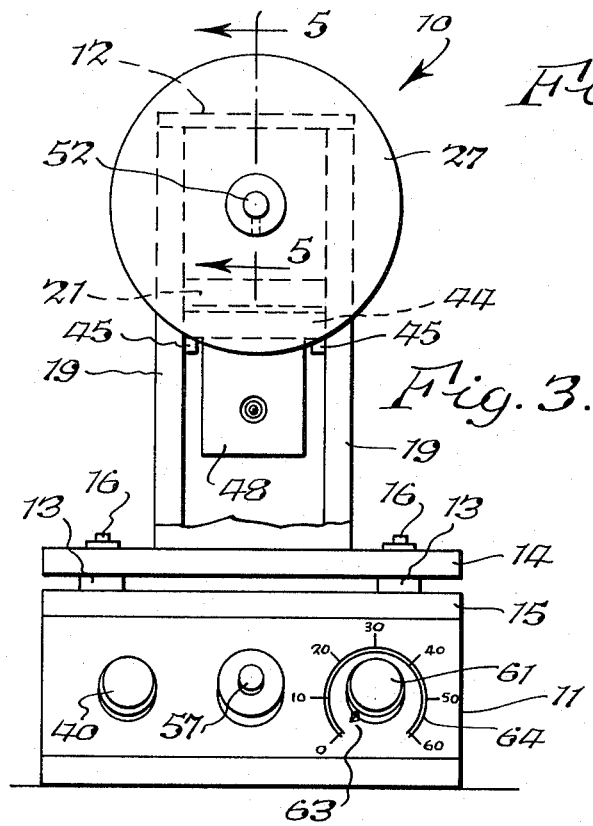
Figure 7:
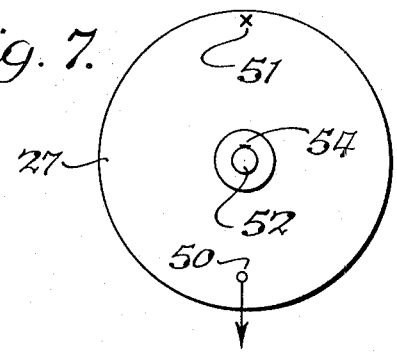
Figure 8:
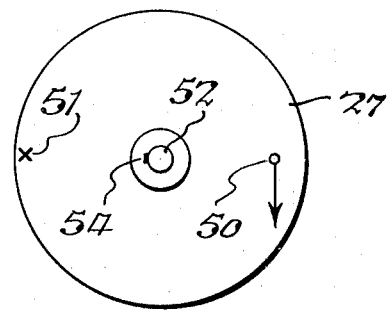
Figure 5:
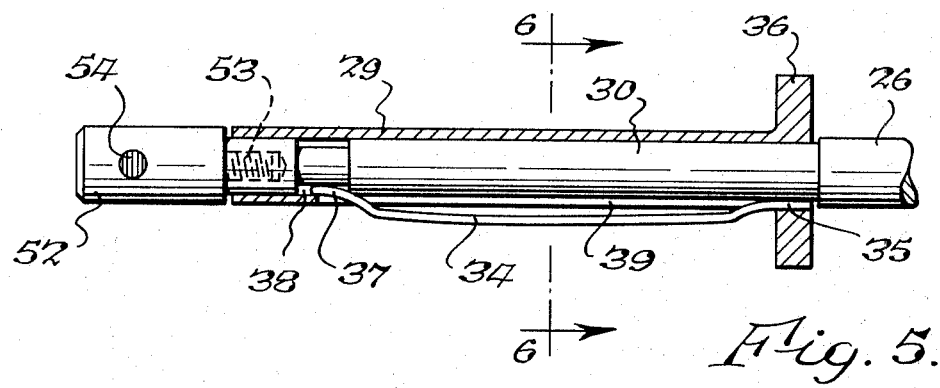
Figure 6:
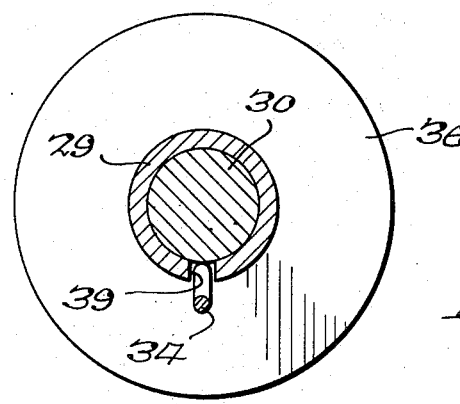

FIG. 3. is an end elevational view taken from the left of FIG. 3 with portions partially broken away;

FIG. 4 is a schematic electrical wiring diagram of the unbalance detector;

FIG. 5 is a fragmentary cross sectional view taken substantially along line 5—5 of FIG. 3 and showing the structure for mounting the object to be balanced on the shaft of the unbalance detector;

FIG. 6 is a cross sectional view taken substantially along line 6—6 of FIG. 5; FIG. 7 is a schematic view showing the position of the object to be balanced after its point of maximum effective unbalance gravitates to a bottom dead center position; and FIG. 8 is a schematic view showing the position to which the object to be balanced is moved during the balancing operation.

The improved unbalance detector 10 of the present invention includes a lower base portion or housing 11 on which an upper base portion or housing 12 is mounted by a plurality of vibration isolators 13, which are essentially resilient pads interposed between housing bottom plate 14 and the top plate 15 of housing 11. Suitable bolts 16 secure plates 14 and 15 to each other with vibration isolators 13 therebetween.

Housing 12 includes front end wall 17, rear end wall 18, side walls 19, and top wall 20. Rear wall 18 is selectively removable to permit access to the inside of housing 12. A shelf 21 is suitably secured to opposite side walls 19 and extending upwardly from shelf 21 are blocks 22 and 23 which support a bearing housing 24 which mounts spaced ball bearings 25 which journal shaft 26.

A workpiece 27 which is to be balanced includes a central opening 28 which permits it to be mounted on sleeve 29 which is rotatably mounted on reduced end portion 30 of shaft 26 with a friction-fit so that sleeve 29 will remain in any circumferential position to which it has been adjusted on end portion 30. The workpiece 27 includes a collar 31 which is adapted to receive a set screw in opening 32 which is placed in alignment with spring wire insert 34 when the workpiece is mounted on sleeve 29. Spring wire insert 34 has end portion 35 fixedly secured to collar 36 formed at the end of sleeve 29. The opposite end 37 of spring insert 34 is slidably received within portion 38 of sleeve 29. Since spring insert 34 is located in slot 39 in sleeve 29, it will be retained in this circumferential position defined by slot 39, but it can be moved toward and away from shaft 30 because of the slidable connection at end 37. Because of the biasing action of spring 34, the workpiece will be mounted on sleeve 29 in the same manner as if a set screw were mounting it on its shaft on the machine on which it is to be ultimately mounted. Preferably the workpiece 27 is moved onto sleeve 29 until it abuts collar 36 so as to reduce the cantilever effect on bearings 25.

After workpiece 27 has been mounted in the foregoing manner, the vibratory control knob 40 (FIGS. 3 and 4) is rotated so as to complete a circuit from the voltage source 41 through vibratory motor 42 which is mounted on base 43 secured to baseboard 44 which is slidably received on guides 45 secured to opposite housing sides 19. A shaft 46 extends from motor 42 and its outer end is supported in bearing 47 mounted on block 48 which is secured to baseboard 44. A flyweight 49 is keyed to shaft 46. When motor 42 is energized in the above described manner, the rotation of flyweight 49 will cause housing 12 to vibrate, thereby reducing any frictional forces at bearing 25 so as to permit shaft 26 supported therein to rotate because of any unbalance of workpiece 27 until such time that the point of effective maximum unbalance 50 of workpiece 27 gravitates to bottom dead center (FIG. 7). It will be appreciated that if the workpiece does not rotate at all after the vibratory motor 42 has been energized, it can be assumed that the workpiece 27 is balanced statically. It will also be appreceiated that motor 42 may be energized to produce vibration for all or any part of the balancing cycle. appreciated After workpiece 27, if unbalanced, has rotated so that point 50 is at bottom dead center, a suitable mark 51 is placed on the workpiece at top dead center, as shown in FIG. 7. At this time sleeve 29 is grasped by the person operating the machine and is held so that mark 51 remains at top dead center. The end piece 52, which is tightly screwed into shaft 26 at 53 so that it cannot turn independently of the shaft, is then also grasped and turned until such time as mark 54 thereon is pointing upwardly and lies in the same vertical plane as mark 51. Because of the slidable connection between sleeve 29 and shaft 26, as described above, the rotation of end piece 52 will permit shaft 26 to rotate while the workpiece 27 is held stationary. The rotation of shaft 26 causes a corresponding rotation of pin 55 which is mounted on collar 56 rigidly fixed to shaft 26, and since pin 55 is in line with mark 54, when mark 54 is pointing upwardly, pin 55 will also be pointed upwardly so that at this time mark 54, pin 55 and mark 51 will all lie in the same vertical plane and all will be at their top position.

Figure 1:
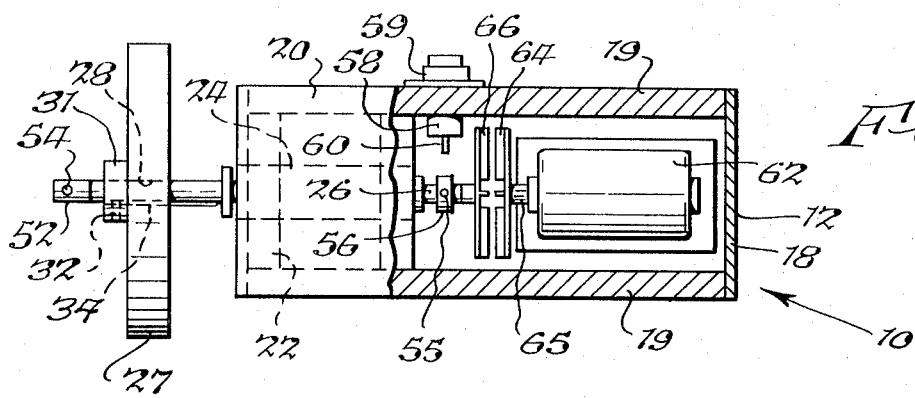
FIG. 1 is a plan view, with certain parts partially broken away, showing the improved unbalance detector of the present invention.

At this time button 57 is depressed to complete a circuit through solenoid coil 58 which is a part of solenoid 59 mounted on wall 19 of housing 12 (FIG. 1). This will cause solenoid armature or pin 60 to project inwardly toward collar 56 to about the position shown in FIG. 1. It is to be noted that pin 60 is horizontal, and in the position of FIG. 1, pin 55 is vertical. Therefore, if pin 55 were to travel toward pin 60 due to rotation of shaft 26, it would move through an arc of 90°. Actually, pin 60 serves as a stop for pin 55 when pin 60 is in its extended position.

Figure 2:
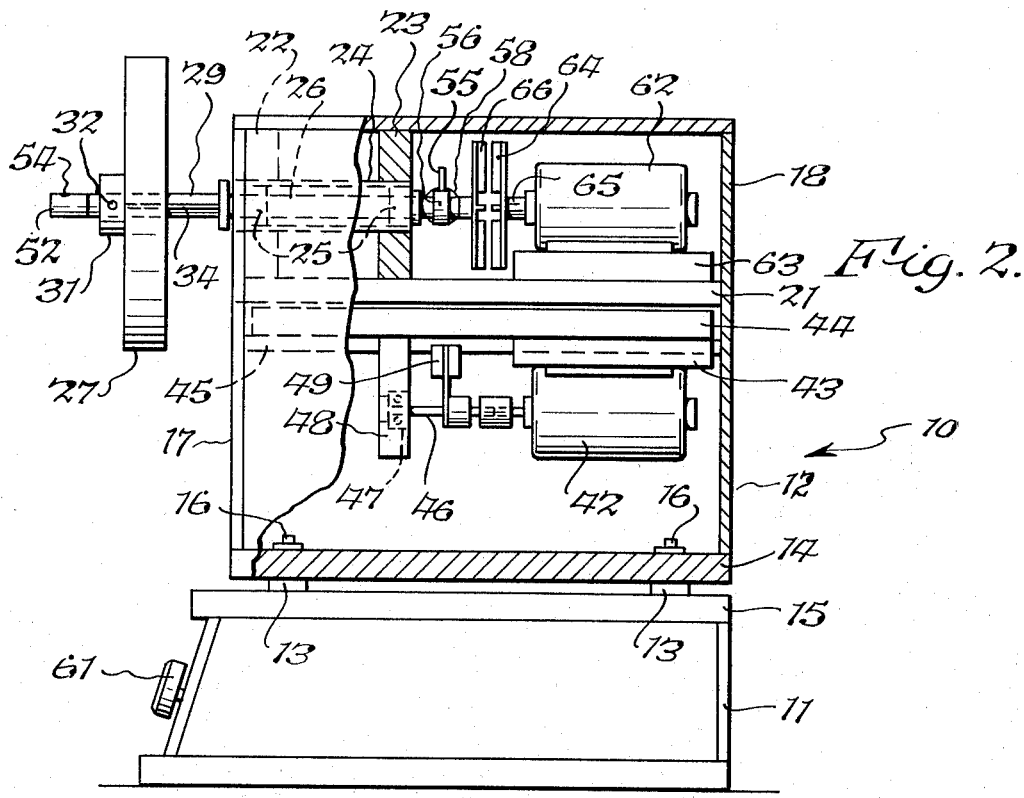
FIG. 2 is a side elevational view with portions partially broken away of the unbalance detector shown in FIG. 1.

At this time the amount of unbalance of workpiece 27 is determined. In this respect, control knob 61 (FIGS. 3 and 4) is rotated in a clockwise position from its zero setting to vary the voltage across electric motor 62 which is mounted on base 63 secured to shelf 21. An impeller blade 64 is keyed to output shaft 65 of motor 62. The speed of rotation of impeller 64 will be determined by the setting of control knob 61. A second impeller blade 66 is mounted on the right end of shaft 26 (FIGS. 1 and 2) which is in axial alignment with shaft 65. Therefore, rotation of impeller 64 will induce rotation of impeller 66 which is spaced from impeller 64. It is to be especially noted that there is absolutely no mechanical connection between impellers 64 and 66. The relationship is that there is an air space therebetween so that in essence impellers 64 and 66 act in the nature of a slip-coupling, and more specifically a fluid coupling.

The control knob 61 is rotated to vary the voltage across motor 62 and thereby gradually increase the speed of impeller 64. A point will be reached where impeller 66 will be caused to rotate with impeller 64 because of the fluid coupling relationship therebetween and eventually the workpiece 27 will be caused to rotate from the position shown in FIG. 7, wherein marking 51 was at the top dead center, to the position shown in FIG. 8, wherein the marking 51 is located 90° counterclockwise from the FIG. 7 position. The workpiece 27 will stop in the position of FIG. 8 because pin 55 will engage pin 60. At this time control knob 61 is rotated slowly in a counterclockwise direction and a point will be reached where the workpiece 27 starts to swing in a clockwise direction in FIG. 8. At this time the control knob pointer 63 will indicate the exact amount of unbalance in the workpiece as shown on scale 64 and it will indicate a numerical value corresponding to the amount of counterweight compensation that must be applied at the marked point 51 in terms of ounce-inches or other suitable values normally used in balancing of workpieces, as the dial 64 can be calibrated in any suitable manner. In other words, when workpiece 27 just starts swinging in a clockwise direction from its FIG. 8 position, motor 62 is rotating at a speed which is substantially causing the point 50 of effective maximum unbalance to be maintained in its FIG. 8 position.

In the operation of the balancing machine 10, the operator of the machine has the option of making a running test of the workpiece 27 either before or after the above described balancing procedure. In this respect, if the running test is to be made before the balancing procedure, the workpiece 27 is mounted in the above described manner and thereafter the control knob 61 is advanced fully in a clockwise direction. This will cause motor 62 to drive impeller 64 at the highest speed and this in turn will drive impeller 66 at high speed, which in turn will rotate workpiece 27 at high speed. Any perceptible vibration, as developed by the rotating workpiece 27, can be noted by resting the hand on any part of housing 12. Of course, at this time solenoid 59 is not actuated so that there will be no interference between pin 55 and pin 60 of the solenoid. Of course, if the running test is to be performed after balancing, solenoid 59 must be deenergized to permit free rotation of pin 55.

While the foregoing description has referred to the shaft 26 as being horizontal, it will be appreciated that it need not be perfectly horizontal but may be inclined and still be within the scope of the present invention. In addition, while the foregoing description has disclosed a specific type of slip-coupling, it will be appreciated that other types of slip-couplings may also be used within the scope of the present invention.

While a preferred embodiment of the present invention has been disclosed, it will be appreciated that the present invention is not limited thereto but may be otherwise embodied within the scope of the following claims.

What is claimed is:

1. An unbalance detector comprising base means, a shaft having first and second spaced portions, bearing means mounting said shaft on said base means, means on said first portion for mounting a workpiece to be balanced, whereby said workpiece may gravitate to a position wherein its point of effective maximum unbalance is located at bottom dead center, motor means, speed control means for said motor means, slip-coupling means effectively located between said motor means and said second portion of said shaft, whereby said point of effective maximum unbalance may be substantially maintained in a predetermined position other than bottom dead center by adjusting the speed of said motor means, and means correlated with said speed control means for indicating the value of the counterweight required to maintain said point of effective maximum unbalance in said predetermined position.

2. An unbalance detector as set forth in claim 1 wherein said slip-coupling means comprises a fluid coupling.

3. An unbalance detector as set forth in claim 2 wherein said fluid coupling comprises a first impeller driven by said motor means, and a second impeller mounted on said second portion and in axial alignment with said first impeller.

4. An unbalance detector as set forth in claim 1 including stop means for stopping said workpiece in said predetermined position.

5. An unbalance detector as set forth in claim 4 wherein said predetermined position is substantially 90° from said bottom dead center position.

6. An unbalance detector as set forth in claim 4 wherein said stop means comprises a first member on said shaft, and a second member on said base means for engagement by said first member when said workpiece reaches said predetermined position.

7. An unbalance detector as set forth in claim 6 including mounting means for mounting said workpiece for adjustable circumferential movement on said first portion of said shaft whereby said first member and said point of effective maximum unbalance of said workpiece may be oriented relative to each other in a predetermined relationship.

8. An unbalance detector as set forth in claim 7 wherein said mounting means comprises a sleeve mounted on said shaft and in frictional engagement therewith.

9. An unbalance detector as set forth in claim 6 including means for selectively effecting relative retracting movement between said first and second members to thereby permit movement of said workpiece beyond said predetermined position.

10. An unbalance detector as set forth in claim 8 wherein said first member comprises a first protuberance on said shaft and wherein said second member comprises a second selectively movable protuberance on said base means.

11. An unbalance detector as set forth in claim 9 wherein said second protuberance comprises the armature of a solenoid.

12. An unbalance detector as set forth in claim 1 including vibrator means for selectively vibrating said base means to hasten the gravitation of said workpiece to said bottom dead center position.

* * * * *